(12) United States Patent
Barefoot

(10) Patent No.: US 6,631,915 B2
(45) Date of Patent: Oct. 14, 2003

(54) BICYCLE FORK TRAVEL LIMITER

(75) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

(21) Appl. No.: 09/920,107

(22) Filed: Aug. 1, 2001

(65) Prior Publication Data

US 2002/0074769 A1 Jun. 20, 2002

Related U.S. Application Data

(60) Provisional application No. 60/222,530, filed on Aug. 2, 2000.

(51) Int. Cl.[7] ............................................. B62K 21/02
(52) U.S. Cl. ....................................................... 280/276
(58) Field of Search ................................ 280/275, 276, 280/277, 283, 284, 124.102

(56) References Cited

U.S. PATENT DOCUMENTS

| | | | | |
|---|---|---|---|---|
| 4,807,860 A | * | 2/1989 | Simons | 267/217 |
| 5,301,969 A | * | 4/1994 | Bynoe | 280/221 |
| 5,332,068 A | * | 7/1994 | Richardson et al. | 188/275 |
| 5,911,428 A | * | 6/1999 | Ueda et al. | 280/276 |
| 6,095,541 A | * | 8/2000 | Turner et al. | 280/276 |
| 6,105,987 A | * | 8/2000 | Turner | 280/276 |
| 6,120,049 A | * | 9/2000 | Gonzalez et al. | 280/276 |
| 6,260,832 B1 | * | 7/2001 | Vignocchi et al. | 267/64.15 |

* cited by examiner

Primary Examiner—Lesley D. Morris
Assistant Examiner—Paul Royal, Jr.
(74) Attorney, Agent, or Firm—Jason H. Foster; Kremblas, Foster, Phillips & Pollick

(57) ABSTRACT

A bicycle fork travel limiter that limits the maximum extension of the fork, but permits the fork to function as a shock-absorbing unit. A ratchet rod with teeth on the side thereof connects to the upper member of one leg of the fork. A shuttle is slidably mounted to a neutral shaft mounted to the lower member, and contains two pawls that engage and disengage from the teeth based upon the rotational position of the ratchet rod. A coil spring biases the shuttle upwardly toward the ratchet rod. The ratchet rod can move downwardly when the fork is compressed, but upon release of the compression on the fork, the shuttle, with its pawls engaging the teeth, prevents rebound of the upper member other than through a shortened stroke.

13 Claims, 4 Drawing Sheets

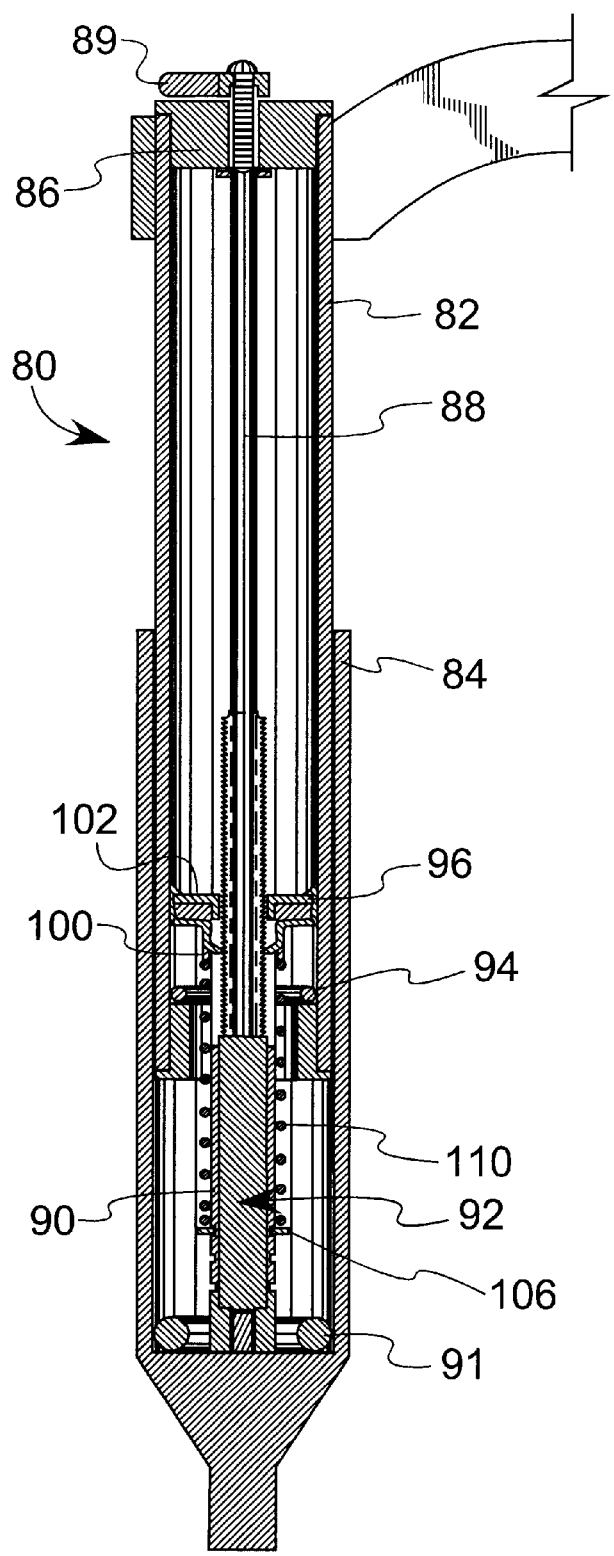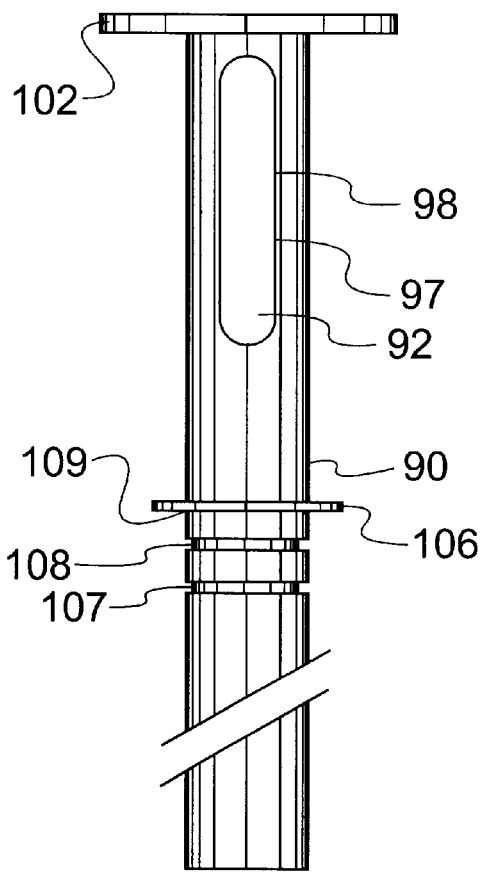
FIG. 6
FIG. 7

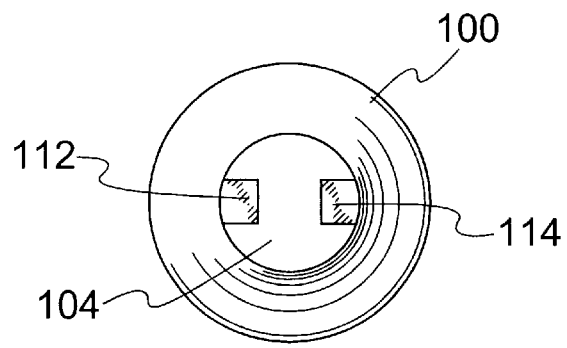
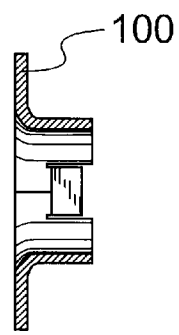
FIG. 8  FIG. 9
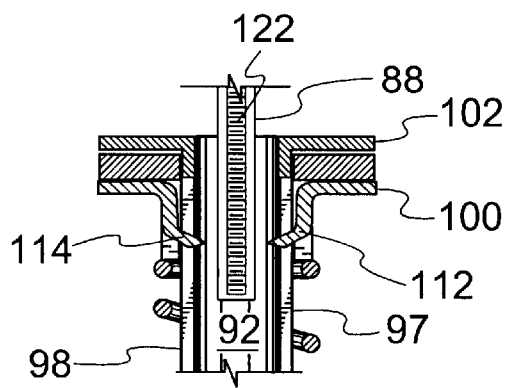
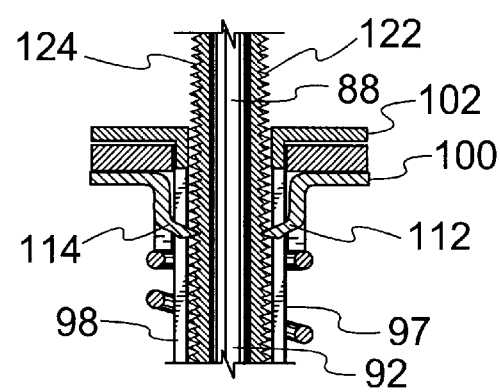
FIG. 10  FIG. 11

BICYCLE FORK TRAVEL LIMITER

CROSS-REFERENCES TO RELATED APPLICATIONS

This application claims the benefit of Provisional U.S. Application Serial No. 60/222,530 filed Aug. 2, 2000.

STATEMENT REGARDING FEDERALLY-SPONSORED RESEARCH AND DEVELOPMENT (Not Applicable)

REFERENCE TO A "MICROFICHE APPENDIX"

(Not Applicable)

BACKGROUND OF THE INVENTION

1. Field of the Invention

The invention relates generally to suspension components on a vehicle having a single front wheel, and more particularly to a bicycle front fork travel limiter.

2. Description of the Related Art

Conventional bicycles have a frame component to which the front wheel is mounted. This component is the fork, which has legs that are positioned on opposite sides of the wheel. The wheel's axle mounts to or near the lower ends of each of the fork's legs and the radially extending portion of the wheel is interposed between the legs.

The legs of the fork extend upwardly from the wheel's axle to a crown, which rigidly connects the upper ends of the fork together just above the peripheral tread surface of the tire on the wheel. A cylindrical steering tube is rigidly mounted to the upper surface of the crown, extending approximately vertically through a cylindrical passage at the front of the bicycle's frame. The cylindrical passage's axis is coincident with the steering tube's axis, and the cylindrical passage thereby functions as a bearing to support the steering tube and permit it to rotate about the axis of the steering tube. There are normally ball bearings to reduce the friction at the interface of the steering tube with the cylindrical passage.

The steering tube is mounted to the steering stem, which is the structure to which the handlebars attach. Therefore, when the handlebars are pivoted about the axis of the steering tube, the fork and the wheel's axle, and therefore the wheel, rotate.

On some conventional bicycles, especially those designed for off-road use, there are shock-absorbing structures built into the bicycle's frame. The shock-absorbing structure of the front wheel is ordinarily built into the fork. The most common example is a telescoping structure in which each of the fork's legs is divided into two telescopically engaging members. In such a telescoping structure, each leg comprises an upper leg member having an outer, cylindrical surface extending downwardly from the crown into a lower leg member having an internal cylindrical surface. Typically the telescoping arrangement contains coils, elastomeric materials, compressed gas or other mechanical means for biasing the leg members away from one another and for damping the spring action of the fork, just as in shock absorbers for other vehicles. It is important for the purposes of negotiating the ruts and bumps of rough terrain for a bicycle to have shock-absorbing capability, particularly at its front wheel.

All things being equal, the longer the relative movement between the upper member of the suspension fork and its lower member, the greater its capability to absorb shocks. However, the size of the front wheel of the bicycle affects the lower limit of the movement, or travel, of the upper member part of the fork. Increasing the travel of the lower member necessitates extending the upper member of the fork upward, and thereby necessitates an increase in the height of the front of the bicycle to accommodate this extension. This extension of the fork and corresponding increase in ride height results in two well-known problems.

The first problem occurs because, for mechanical reasons, the steering tube of most bicycles is tilted backward from true vertical, placing the wheel's axle slightly forward of the steering tube. As the fork is extended upward to allow for greater travel, the angle between the fork and the plane of the ground must become more acute to accommodate the size restrictions discussed above. This results in less precise steering, a larger turning radius and other disadvantages that are well known in the art.

The second problem is that the greater the height of the front of the bicycle, the greater the difficulty a rider has maintaining optimum position and weight distribution when climbing a hill.

In addition to these two problems related to the increase in height of the front of the bicycle inherent in suspension forks, there is another problem related to the telescopic movement of the fork. During vigorous pedaling, as during climbing and sprinting, a bicycle rider must stabilize himself with the handlebars while rapidly shifting his position from side to side relative to the bicycle. At such times the same range of travel of the suspension fork that is advantageous in absorbing shocks becomes disadvantageous insofar as it absorbs energy that would otherwise be transmitted to the drive wheel. A temporary decrease in the front fork's travel range would help a rider in such a situation. In other situations, such as making banking turns over smooth terrain, a rider would benefit from a temporary increase in the fork's resistance to movement and a decrease in its range of movement.

Various devices have been created to address the problems cited above. Some of these consist of fork "lock-out" mechanisms that substantially increase the fork's resistance to movement under compression, either by mechanically preloading the spring or by severely restricting the transit of a gas or fluid damping media. These devices solve one problem, that of undesired movement of the fork in certain situations. Typically, however, they maintain the fork at the upper limit of its extension, exacerbating the problems caused by increased height of the front of the bicycle.

One type of lock-out allows the fork to be "frozen" or arrested in a partially compressed position by completely closing off the orifices which permit the flow of damping fluid in the shock-absorbing mechanism. Rather than simply altering the fork's range and threshold of movement to better suit a given situation, this device less ideally eliminates all suspension action in the front end of the bicycle.

Further disadvantages to lock-out devices include difficulty of engagement due to the position of the device on the bicycle and, where they involve hydraulic valving, the cost of manufacture.

Therefore, the need exists for a mechanism that when actuated limits the extension of the front fork and thereby lowers the height of the bicycle's front end while increasing the threshold of movement of the fork by effectively preloading its spring. Such a device would allow the rider to improve the front-end geometry of the bicycle for climbing and steering at speed. At the same time, the device would reduce "bob" or unwanted fork movement in such situations while still retaining a degree of front-end suspension for negotiating roughness in the terrain.

SUMMARY OF THE INVENTION

The invention is a bicycle fork travel limiter mounted to a bicycle frame. The frame includes a front wheel fork having first and second legs extending around opposite sides of a front wheel. Each of the legs has an upper leg member moveably connected to a corresponding lower leg member. Each of the lower leg members is movable relative to its corresponding upper leg member in a compression direction and an opposite, rebound direction through an original fork stroke.

With reference to FIG. 1, the travel limiter comprises a first link, such as the member 11, connected to at least one of the upper leg members, and a second link, such as the cable 26, connected to at least one of the lower leg members. Actuable means, such as the travel limiter 10, is connected to the first and second links for, when the actuatable means is unactuated, permitting movement of the lower leg members relative to the upper leg members in the compression and rebound directions through the fork stroke; and, when the means is actuated, permitting movement of the lower leg members relative to the upper leg members in a first of said directions through the fork stroke and limiting movement of the lower leg members relative to the upper leg members in a second of said directions.

BRIEF DESCRIPTION OF THE SEVERAL VIEWS OF THE DRAWINGS

FIG. 6 is a side view in section illustrating an alternative embodiment of the present invention.

FIG. 7 is a side view illustrating the neutral shaft.

FIG. 8 is a top view illustrating the shuttle.

FIG. 9 is a side view illustrating the shuttle.

FIG. 10 is a side view in section illustrating the pawls in a disengaged position relative to the ratchet rod.

FIG. 11 is a side view in section illustrating the pawls in an engaged position relative to the ratchet rod In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE INVENTION

Figure 1:
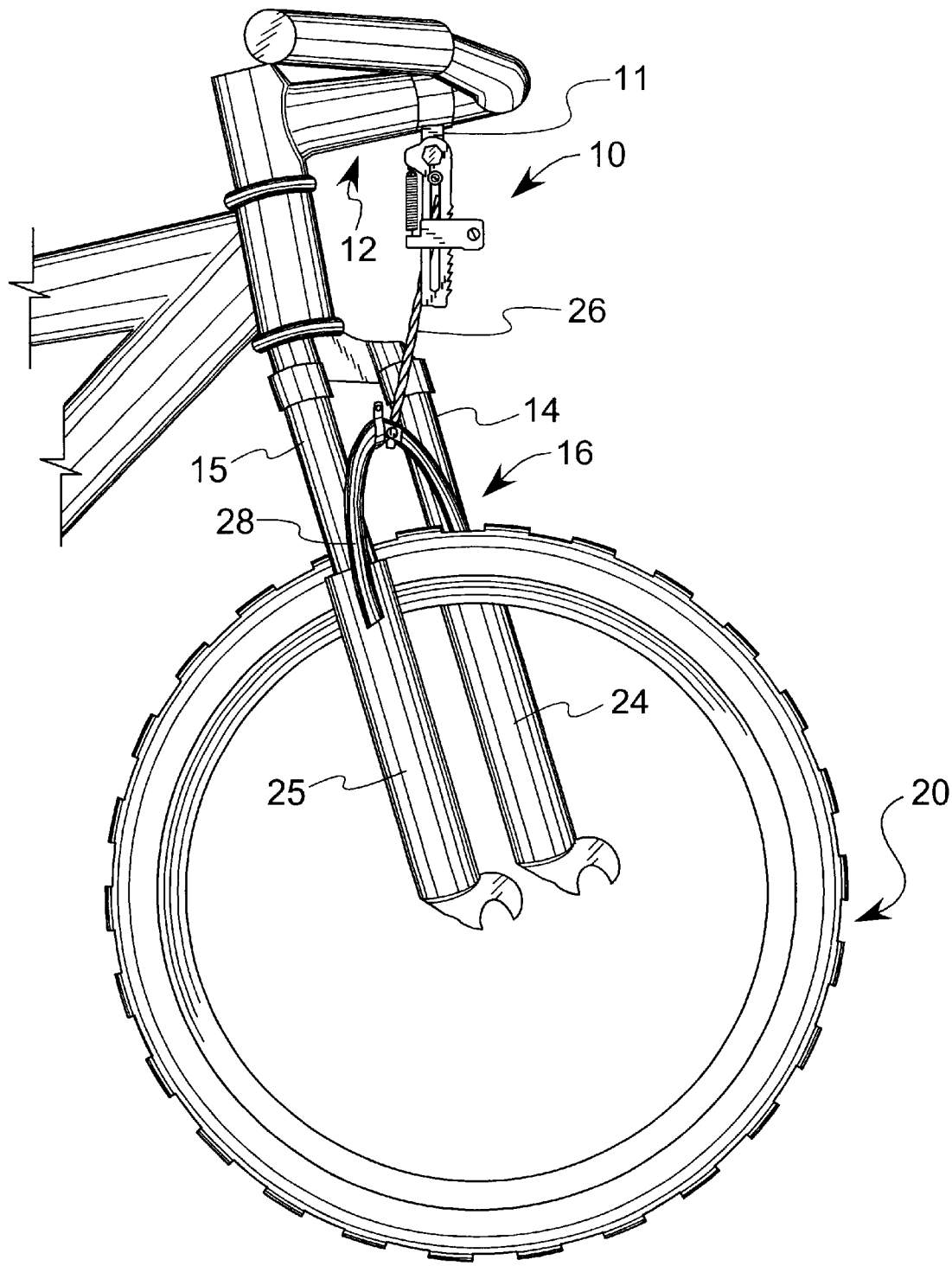
FIG. 1 is a side view illustrating the preferred embodiment of the present invention in its operable position on an otherwise conventional bicycle.

The preferred embodiment of the present invention is shown in FIG. 1 mounted in its operable position to the steering stem 12. The upper legs 14 and 15 of the fork 16 insert telescopically into the lower legs 24 and 25. The wheel 20 is rotatably mounted to the lower ends of the lower legs.

Figures 2, 3:
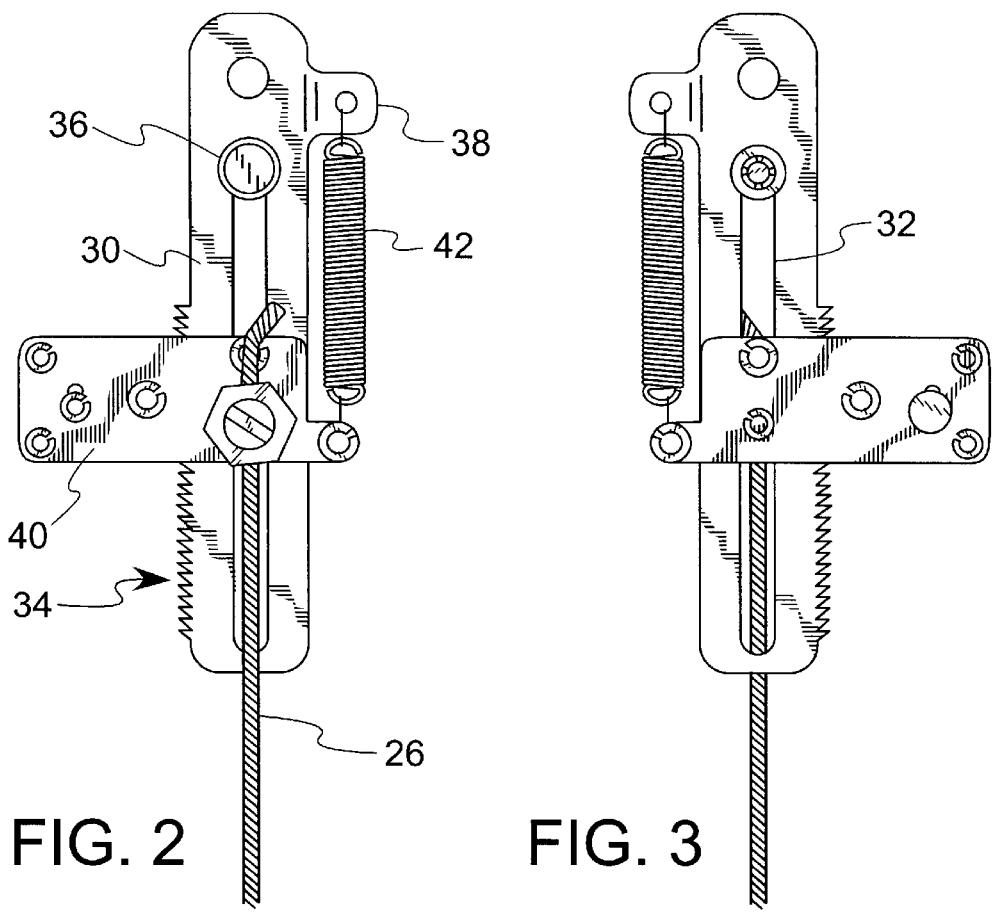
FIG. 2 is a left side view illustrating the preferred embodiment of the present invention.
FIG. 3 is a right side view illustrating the preferred embodiment of the present invention.

Referring to FIGS. 2 and 3, the preferred travel limiter 10 is shown including the ratchet bar 30, which is the frame of the travel limiter 10. The ratchet bar has an elongated body that is preferably made of a lightweight, rigid material, for example steel, a non-ferrous alloy or a composite.

An elongated slot 32 is formed along the length of the ratchet bar, providing a guide for the shuttle 40 that is mounted to the ratchet bar. An adjustably mounted limiter screw 36 attaches to the ratchet bar 30 in the slot 32 for shortening the effective length of the slot 32. The limiter screw 36 is preferably a conventional screw with a nut on one end for tightening the screw head and the nut against opposing sides of the ratchet bar.

A plurality of ratchet teeth 34 are formed on the edge of the ratchet bar, and a spring-mounting ear 38 is formed on an opposite edge of the ratchet bar. A spring 42 extends from the ear 38 to the shuttle 40 to bias the shuttle toward the spring mounting ear 38. As can be seen from FIG. 1, the cable 26 extends downwardly from the shuttle and, as is shown in FIG. 1, mounts rigidly to the yoke 28, which is rigidly mounted to the lower legs 24 and 25.

Figures 4, 5:
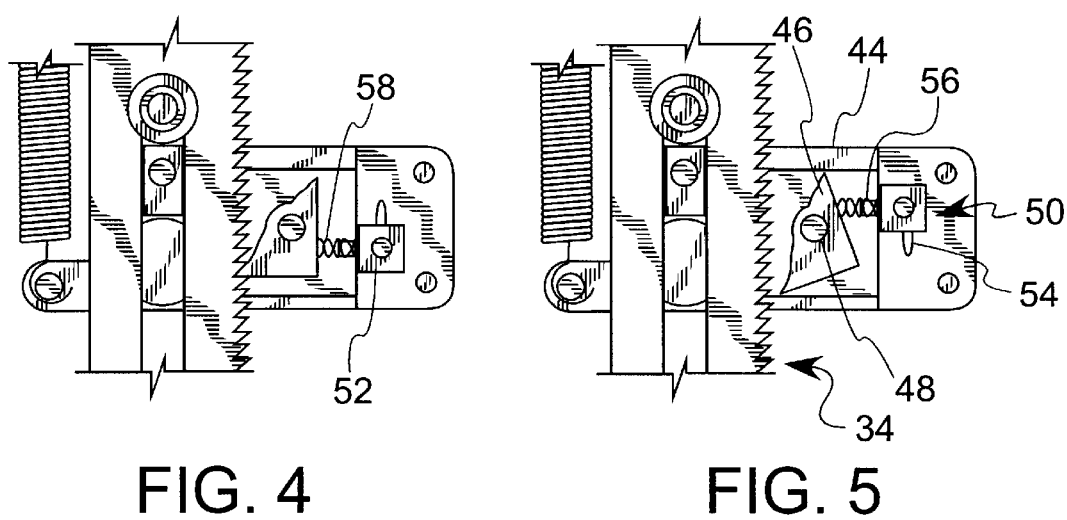
FIG. 4 is a right side view in section illustrating the mechanisms housed within the shuttle and their orientations in the "ON" position relative to other structures of the present invention.
FIG. 5 is a right side view in section illustrating the mechanisms housed within the shuttle and their orientations in the "OFF" position relative to other structures of the present invention.

The shuttle 40, which is slidably mounted to the ratchet bar 30, is shown in more detail in FIGS. 4 and 5. A shuttle housing 44 contains a pawl 46 that is pivotably mounted to the housing by the pin 48 extending through the pawl into the housing.

A switch 50 for actuating the pawl 46 to pivot toward or away from the ratchet teeth 34 comprises several parts. A switch body 52 is slidably mounted in the slot 54 formed in the housing 44. A finger 56 extends from the switch body toward the pawl. A coil spring 58 is mounted about the finger 56 and contacts the side of the pawl that faces the switch body, applying a bias against the pawl and tending to pivot the pawl about the pin 48.

When the switch body is in the position shown in FIG. 4, the pawl tends to rotate clockwise about the pin 48. When the switch body is moved upwardly in the orientation shown in FIG. 5, to the position shown in FIG. 5, the finger and spring also move upwardly, causing the point at which the bias applies its force to move upward also. The bias applied to the pawl at this position tends to rotate the pawl counterclockwise because the spring applies its force to the pawl on the opposite side of the pin 48, which acts as a fulcrum, as it did in the position shown in FIG. 4.

When the switch body 52 is in the "ON" position shown in FIG. 4, the pawl 46, because its teeth-engaging tip is inserted into a gap between two teeth 34, resists movement of the shuttle downwardly relative to the ratchet bar in the orientation shown in FIGS. 2 and 3, and thereby acts as a lock to lock the pawl 46 to the ratchet bar 30, which is the frame of the travel limiter 10, as described above. As described below, this direction of movement is the direction that tends to elongate the fork 16. The shuttle can move relatively freely in the opposite direction (toward the limiter screw 36) until its upper edge seats against the limiter screw. This direction of movement is the direction that tends to shorten the fork 16.

When a rider desires to limit the maximum travel of the upper legs 14 and 15 relative to the lower legs 24 and 25, the switch body is moved to the "ON" position. This moves the pawl 46 into engagement with the ratchet teeth 34 and causes the tip of the pawl to be inserted into a gap between two teeth. Therefore, the shuttle can move upwardly relative to the ratchet bar, but cannot move downwardly because the pawl engaging the teeth prevents such movement. In this manner, the ratchet mechanism permits the travel limiter to "shorten" the length of the fork's travel.

After the switch is moved to the "ON" position, and when the upper legs 14 and 15 are plunged into the lower legs 24 and 25 due a vertical component of force applied to the fork 16, the following occurs. The bias of the tension spring 42 pulls the shuttle up relative to the ratchet bar until either the shuttle strikes the limiter screw or the vertical component of force plunging the upper legs 14 and 15 into the lower legs 24 and 25 becomes too small. The "shortened" travel limiter 10 now limits the travel of the legs of the fork relative to one another.

The travel limiter 10 is "shortened" inasmuch as the shuttle, to which the cable 26 is connected, is closer to the stem. Because the opposite end of the cable 26 is mounted to the lower legs 24 and 25 (through the yoke 28), and because the shuttle is prevented, by the pawl engaging the ratchet teeth, from moving downwardly, the travel of the lower legs 24 and 25 relative to the upper legs 14 and 15 is limited to some lower maximum travel than the fork was originally designed for. In this shortened condition, the fork 16 functions as it normally would, but only within the range of movement shortened by the travel limiter 10. This shortened stroke is smaller than the fork's original stroke.

When the fork is desired to be released to function in a conventional manner, the rider simply switches the switch body 52 to the "OFF" position shown in FIG. 5. Although the spring 56 will then apply a force to the pawl tending to rotate it counterclockwise, the pawl will not necessarily immediately rotate counterclockwise to the position shown in FIG. 5, because it is still engaged between two ratchet teeth 34. However, upon the application of a sufficient vertical component of force to the fork that tends to move the shuttle upwardly, the pawl is released from the gap between the ratchet teeth and freely rotates to the position shown in FIG. 5. Then the shuttle is permitted to move downwardly upon significant decrease in the vertical component of force.

The preferred cable 26 is a conventional bicycle cable that will bend upon the application of a very small force; the cable can support almost no compressive force in the configuration shown in FIG. 1 without bending. However, the cable has substantial tensile strength, permitting it easily to resist deformation or fracture under the force of the fork 16 attempting to travel to its maximum designed length.

Therefore, once the travel limiter switch is moved to the "ON" position and the fork legs are limited to a travel shorter than their maximum designed length, the cable and the other components easily can resist the tensile force the springs in the forks apply in an attempt to reach the maximum designed fork length. However, when a vertical component of force is applied to the fork 16 and the upper legs begin to plunge into the lower legs, the cable will slacken under the compressive force and exert no substantial effect upon the shock-absorbing characteristics of the front fork 16. Thus, the invention provides a shortening of the fork's travel, and thus a pre-loading of the fork's spring, but the fork provides its normal shock-absorbing function within that shortened range of travel.

The present invention has distinct advantages. One advantage is that because, by limiting the travel of the fork the height of the front of the bicycle is reduced, the weight of the rider is better distributed for ascending a hill. Bobbing and difficulty with control in the same situation are decreased or avoided completely because the preloaded fork has an increased resistance to movement. An additional advantage is that within the shortened range of travel permitted by the travel limiter 10 the fork can continue to absorb shocks caused by impacts with sufficient components of force. In other words, even while the rider enjoys the advantage of the fork being limited in its stroke length, within that limited stroke the fork still functions as a shock absorber, albeit a somewhat stiffer one.

Of course, there are many alternative mechanisms for accomplishing what the present invention is intended to accomplish. Such mechanisms are equivalent, as any skilled artisan will notice upon understanding the present invention, and do not depart from the spirit of the invention.

For example, one could substitute a rotatably sprung reel having a ratchet or cam-locked mechanism for the ratchet bar, shuttle and cable. A coil spring that is mounted to bias the reel in one direction could be made to be adjustable by adjusting the position of one end of the spring. A cable wound around the reel extends to attachment to the lower legs of the fork. The analogous ON/OFF switch is a ratchet lever that engages and disengages with radial teeth extending circumferentially around the reel. Alternatively, a cam could engage and disengage the reel by manual rotation by the rider.

The same mechanical goal could be achieved with a cable adjustably fixed at its lower end to a clamp on the fork brace, such a cable having a fitting at its upper, free end which could be retained in a key-hole slot in a bracket mounted to the bicycle stem. By leaning hard on the handlebars the rider could attach the cable's free end. The rider later could in the same manner detach the cable end from the bracket and then tie or otherwise bind the cable to a structure of the front upper portion of the bicycle until the next use. The upper means for attachment could, if desired, be pivotably connected to the stem so that by a cam-action a rider can draw the cable tighter than he or she otherwise would be able to. Unlike the preferred embodiment, this device could not be engaged by the rider while riding, but could be engaged during a brief stop before climbing a hill, for example, and disengaged during a brief stop immediately afterward.

Another example of an alternative means of accomplishing a similar purpose is a substantially rigid rod mounted to the lower legs of the fork and extending upwardly. Extending downwardly from the handlebar stem is an L-shaped, pivotably mounted bracket with a forwardly facing slot in the lower leg of the L-shaped bracket. The top end of the rod extends through the slot, and an axially adjustable stop on the rod, such as a nut and washer, prevents the rod from dropping below the lower leg of the "L."

When the stop is adjusted, it will engage the lower leg of the bracket and thereby limit downward movement of the rod, and therefore, the lower leg of the fork. The stop can be adjusted to adjust the travel of the fork, and when the mechanism is not to be active, the bracket can be pivoted away from the stop on the rod, thereby allowing the rod, and therefore the lower legs of the fork, to travel between the minimum and maximum extent for which the fork was designed.

As a still further alternative, the axially adjustable stop could be replaced with a hydraulic system in which the stop is adjusted by movement of a hydraulic cylinder. Of course, although the devices described above specify that a cable mounts to the lower legs of the fork and the ratcheting device mounts rigidly to the handlebar stem, the two could be reversed. Alternatively, because the ultimate intent is to link the upper and lower legs of the fork together, the handlebar stem need not be considered the only connecting point for the invention. It is the preferred connecting point because of its rigid connection to the upper legs of the fork and its proximity to the rider's hands, which actuate the device. Any structure that is rigidly connected to the upper leg of the fork would serve adequately as a connecting point.

Other hydraulic and pneumatic apparatuses could be designed to provide the same function as the present invention. Such mechanisms may be analogous to the present invention or may involve significant changes thereto. However, the general principle can exist in many devices, which will become apparent to one of ordinary skill in the art from this description.

FIG. 6 shows another embodiment of the invention in which the parts that function to limit travel of the fork are all contained within a first of two legs 80 of a bicycle's front fork. The second leg of the fork (not shown) contains a conventional spring, such as a coil, gas or elastomeric spring. The leg 80 of the fork has an upper leg member 82 that is telescopically connected to, by being slidably inserted coaxially within, a lower leg member 84. Of course, the lower leg member 84 could be slidably inserted within the upper leg member 82 and the two would still be telescopically connected.

Across the top opening of the upper leg 82 is a cap 86 to which a ratchet rod 88 is rotatably mounted coaxial to the upper leg 82. An actuator, such as the on/off lever 89, is mounted to the upper end of the ratchet rod 88 on the external surface of the fork to permit manual rotation of the ratchet rod 88. Of course, the on/off lever 89 could be replaced or supplemented by any conventional mechanism for rotating the ratchet rod 88, including a cable that extends to the bicycle's handlebars for manual manipulation closer to the normal hand positions of a bicycle rider.

A neutral shaft 90 is rigidly mounted coaxially to the bottom of the lower leg 84. The neutral shaft 90 has a longitudinal passage 92 into which the lower end of the rod 88 is slidably inserted. Thus, when the upper leg 82 plunges into the lower leg 84, which is generally referred to as the "compression" direction of relative movement, the ratchet rod 88 extends further into the neutral rod 90. Bumpers 91, 94 and 96 prevent relative movement of the legs 82 and 84 beyond a predetermined range in both the compression and the opposite, "rebound" direction. The "stroke" of the fork is the distance between the extremes of compression and rebound. The original stroke is the stoke the fork is designed to have when it is functioning without the effect of the instant invention.

Referring to FIG. 7, the neutral shaft 90 is a cylindrical tube having first and second slots 97 and 98 formed on opposite sides thereof. The slot 98 is not distinguishable from the slot 97 in FIG. 7, because the slots are essentially identical and they are aligned one behind the other. A circular flange 102 extends radially outwardly from the top end of the neutral shaft 90.

An adjustable spring stop 106, which is a planar, preferably spring steel annular disk having a central aperture and a slot extending from its central aperture to its peripheral edge, is mounted with its central aperture-defining edge in one of three circumferential grooves 107, 108 and 109 on the neutral shaft 90 (see FIGS. 6 and 7). The grooves 107–109 are the possible positions of the adjustable spring stop 106 on the neutral shaft 90. Of course, there could be more than three grooves if more than three positions are desired.

A shuttle 100, shown in FIGS. 6, 8 and 9, has a central aperture 104 through which the neutral shaft 90 slidably extends. In an operable position shown in FIG. 6, the shuttle 100 is mounted on the neutral shaft 90 between the flange 102 and the adjustable spring stop 106. A coil spring 110 is mounted between the lower end of the shuttle 100 and the upper surface of the adjustable spring stop 106. Due to pre-compression of the coil spring 110 between the shuttle 100 and the spring stop 106, the spring 110 biases the shuttle 100 upwardly toward the flange 102.

As shown in FIGS. 10 and 11, the shuttle 100 has first and second pawls 112 and 114 that extend through the slots 97 and 98, respectively, in the neutral shaft 90 and into the passageway 92. The lateral edges of each pawl 112 and 114 are disposed in close proximity to the respective sides of the slots 97 and 98 so that during any rotation of the shuttle 100 each pawl's edge abuts a slot's side. The shuttle 100 is thus restrained from any significant rotation.

Each of the pawls 112 and 114 is flexible, being preferably made of spring steel. Each pawl thereby forms a leaf spring having a predetermined spring constant. When a force with a sufficient transverse component is applied to one of the pawls, the pawl bends a distance that is a function of the magnitude of the force's transverse component.

Because the pawls 112 and 114 extend transversely into the passageway 92, the tips of the pawls 112 and 114 come into the path of the ratchet rod 88, which extends into the passageway 92 parallel thereto. The lower end of the ratchet rod 88 has longitudinal sawtooth ridges 122 and 124 arranged on opposite sides of its outer surface, positioned at approximately 180 degrees from one another. The sawtooth ridges 122 and 124 contain many teeth that are separated by gaps, and the sawtooth ridges 122 and 124 align with the pawls 112 and 114, respectively, when the ratchet rod 88 is rotatingly actuated to the "engaged" position shown in FIG. 11. The sawtooth ridges 122 and 124 can be rotated out of this position by rotating the ratchet rod 88 approximately 90 degrees in either direction to the "disengaged" position shown in FIG. 10. In the FIG. 10 orientation the pawls 112 and 114 do not contact the sawtooth ridges 122 and 124, and therefore, the device is not considered actuated.

When the pawls 112 and 114 come into contact with the sawtooth ridges 122 and 124, the pointed tips of the pawls tend to register in gaps between the teeth thereof under the bias of the pawls. This registration tends to lock the pawls, and therefore the shuttle 100, to the ratchet rod 88 in a unique manner as described below.

The pawls 112 and 114 are angled slightly downwardly, in the illustration shown in FIGS. 10 and 11, which permits the pawls to bend downwardly upon the application of a sufficient force in the downward (compression) direction by the ratchet rod 88. This downward force is caused, for example, by striking a large object with the front wheel, or the rider forcing the handlebars downwardly. When the pawls bend downwardly, they withdraw their tips from the gaps between the teeth of the sawtooth ridges 122 and 124, and permit the ratchet rod 88 to extend further downwardly through the aperture 104 of the shuttle 100 as the pawls pass over the tips of the teeth.

However, any force in the upward (rebound) direction applied by the ratchet rod 88 to the pawls 112 and 114 tends to drive the tips of the pawls into the respective gaps between the teeth, thereby precluding upward bending of the pawls 112 and 114. Thus, when the pawls 112 and 114 engage the ratchet rod's 88 teeth, the shuttle 100 is locked to the ratchet rod 88 during any upward (rebound) displacement of the ratchet rod 88. Rebound movement of the shuttle 100, and therefore the ratchet rod 88, is halted by the flange 102 and the bumper 96 interposed between the flange 102 and the shuttle 100.

In brief summary, therefore, when the fork lock is engaged, by rotatingly actuating the ratchet rod 88 so that the sawtooth strips 122 and 124 align with the pawls 112 and 114, the shuttle is locked to the ratchet rod. In the engaged configuration, movement of the ratchet rod in the compression direction is permitted due to passage of the ratchet rod teeth over the pawls. However, movement of the ratchet rod in the rebound direction is restricted due to the seating of the shuttle 100 against the flange 102 and bumper 96, and the locking of the shuttle to the ratchet rod. This mechanism thereby creates a one-way lock that, after actuation, permits the fork to be compressed, such as by purposely forcing down the front handlebars, but restricts rebound. This situation is desirable as described above, such as when climbing a hill.

In the most preferred embodiment there is some limited movement possible in the compression direction and the rebound direction even when the instant invention is engaged to lock the front fork. This limited possible movement, through what is called the "shortened stroke", is due to a correspondence between the spring constant of the pawls 112 and 114 and the spring constant of the coil spring 110.

In the preferred embodiment, the spring constant of the coil spring 110 is somewhat smaller than the spring constants of the pawls 112 and 114. Thus, when the ratchet rod 88 is first displaced downwardly (after it has been actuated by rotation to align the teeth of the ratchet rod 88 and the pawls 112 and 114), the force it exerts against the pawls and the shuttle compresses the coil spring 110 while only bending the pawls 112 and 114 a small distance; i.e., a distance too small for the teeth of the ratchet rod 88 to pass over the pawls. Stated differently, as the coil spring 110 is compressed by the ratchet rod 88, the opposing force the coil spring 110 exerts against the ratchet rod 88 is small enough initially that the ratchet rod 88 merely displaces the shuttle 100 downwardly a predetermined distance against the coil spring 110. The shuttle 100 is, therefore, simply displaced from the flange 102.

However, as the coil spring 110 is further compressed, the opposing force that the coil spring 110 exerts against the shuttle 100 increases to a threshold. When that threshold is reached, the force exerted by the ratchet rod 88 no longer compresses the coil spring 110 only, but now also bends the pawls 112 and 114 a distance sufficient to permit the teeth of the ratchet rod 88 to pass by the pawls 112 and 114. At this threshold point, the shuttle 100 essentially maintains its position relative to the flange 102, and the ratchet rod 88 moves downwardly relative to the shuttle 100. Thus, the position of the shuttle 100 on the ratchet rod 88 changes, but the shuttle 100 stays in its position spaced from the flange 102.

When the downward (compression) movement of the ratchet rod 88 ceases and the ratchet rod 88 begins its rebound, the pawls 112 and 114 lock into gaps between the teeth on the ratchet rod 88, thereby locking the shuttle 100 to the ratchet rod 88. The ratchet rod 88 and shuttle 100 combination travel upwardly, but can only travel upwardly the distance the shuttle 100 is spaced from the flange 102. This is the distance the shuttle 100 traveled downwardly during compression of the coil spring 110. Once the ratchet rod 88 has moved the shuttle 100 upwardly to seat against the flange 102, the ratchet rod 88 and shuttle 100 combination cannot move upwardly any further, except, of course, to the very small extent the shuttle 100 can compress the bumper 96. However, they can wove downwardly (compress) as far as the bumper 91 will permit. Upon rebound from that compression, however, the ratchet rod 88 can only rebound as far as the shuttle 100 was displaced from the flange 102 during compression. This length of travel of the ratchet rod 88 in the compression and rebound direction due to compression and rebound of the coil spring 110 will always be permitted, and is referred to as the shortened stroke.

The distance between the shuttle 100 and the flange 102 during compression is a function of the stiffness of the coil spring 110 and of the pawls 112 and 114. The relationship between the two determines how far the shuttle travels before the pawls bend far enough to permit the ratchet rod 88 to slide past them. Even within a system that has been preset, the coil spring 110 of the embodiment shown can be adjusted to have an apparently higher spring constant by moving the adjustable spring stop 106 closer to the flange 102. The closer the spring stop 106 is to the flange 102, the more pre-compression there is in the spring 110, and therefore the smaller the shortened stroke will be. The farther the spring stop 106 is from the flange 102, the less pre-compression is obtained, and therefore the larger the shortened stroke will be.

Because of the relationship between the spring constants of the pawls 112 and 114 and the coil spring 110, the shortened stroke exists, even when the ratchet rod 88 is compressed into the neutral shaft 90 as far as possible. The shortened stroke gives the fork some limited travel for absorbing impacts, even when the fork is locked down as far as possible. In a contemplated embodiment, the length of the shortened stroke is a fraction of an inch, and may be determined to be on the order of between one-eighth of an inch to five-sixteenths of an inch. As anyone skilled in the art will recognize, the shortened stroke can be varied from almost nothing, to almost all of the original stroke of the fork, depending upon many factors, including the preference of the rider of the bicycle.

While certain preferred embodiments of the present invention have been disclosed in detail, it is to be understood that various modifications may be adopted without departing from the spirit of the invention or scope of the following claims.

What is claimed is:

1. A bicycle fork travel limiter mounted to a bicycle frame, said frame including a front wheel fork having first and second legs extending around opposite sides of a front wheel, each of said legs having an upper leg member moveably connected to a corresponding lower leg member, and each of said lower leg members being movable relative to its corresponding upper leg member in a compression direction and an opposite, rebound direction through an original fork stroke, the travel limiter comprising:

(a) a first link connected to at least one of said upper leg members;

(b) a second link connected to at least one of said lower leg members; and (c) actuatable means connected to the first and second links for, when said means is unactuated, permitting movement of the lower leg members relative to the upper leg members in the compression and rebound directions through the fork stroke; and, when said means is actuated, permitting movement of the lower leg members relative to the upper leg members in a first of said directions through the fork stroke and limiting movement of the lower leg members relative to the upper leg members in a second of said directions.

2. The bicycle fork travel limiter in accordance with claim 1, wherein the first of said directions is the compression direction, and the second of said directions is the rebound direction.

3. The bicycle fork travel limiter in accordance with claim 2, further comprising a bias connected to the first link and the second link, thereby biasing the first and second links relative to one another.

4. The bicycle fork travel limiter in accordance with claim 2, wherein said means, when actuated, restricts movement of the lower leg members relative to the upper leg members in the rebound direction to movement within a shortened stroke that is smaller than said fork stroke.

5. A bicycle fork travel limiter mounted to a bicycle frame, said frame including a front wheel fork having first and second legs extending around opposite sides of a front wheel, each of said legs having an upper leg member moveably connected to a corresponding lower leg member, and each of said lower leg members being movable relative to its corresponding upper leg member in a compression direction and an opposite, rebound direction through an original fork stroke, the travel limiter comprising:
(a) an elongated ratchet rod connected to at least one of said leg members, said ratchet rod having teeth formed on an outer surface of the ratchet rod;
(b) an elongated neutral shaft connected to another of said leg members, said neutral shaft slidably engaging said ratchet rod; and
(c) at least one pawl connected to the neutral shaft, said pawl having a teeth-engaging tip capable of being positioned in the path of the ratchet rod teeth.

6. The bicycle fork travel limiter in accordance with claim 5, wherein the leg member to which the neutral shaft is connected is the leg member corresponding to the leg member to which said elongated ratchet rod is connected.

7. The bicycle fork travel limiter in accordance with claim 5, further comprising:
(a) a shuttle slidably mounted to the neutral shaft and said at least one pawl mounted to said shuttle; and
(b) a bias mounted between the shuttle and said leg member to which said neutral shaft is connected for biasing the shuttle in a predetermined direction.

8. The bicycle fork travel limiter in accordance with claim 7, further comprising an actuator for displacing the ratchet rod relative to said pawl for engaging the pawl and the ratchet teeth during relative displacement of the upper and lower leg members.

9. A bicycle fork travel limiter mounted to a bicycle frame, said frame including a front wheel fork having first and second legs extending around opposite sides of a front wheel, each of said legs having an upper leg member moveably connected to a corresponding lower leg member, and each of said lower leg members being movable relative to its corresponding upper leg member in a compression direction and an opposite, rebound direction through an original fork stroke, the travel limiter comprising:
(a) an elongated ratchet rod rigidly connected to at least one upper leg member, said ratchet rod having teeth formed on an outer surface of the ratchet rod;
(b) an elongated neutral shaft rigidly connected to at least one lower leg member, said neutral shaft having a central passageway into which said ratchet rod slidably extends;
(c) a shuttle slidably mounted to the neutral shaft, said shuttle including at least one pawl with a teeth-engaging tip capable of being positioned in the path of the ratchet rod teeth;
(d) a bias mounted between the shuttle and said at least one lower leg member for biasing the shuttle in a predetermined direction; and
(e) an actuator for displacing the ratchet rod relative to the pawl for engaging the pawl and the ratchet teeth during relative displacement of the upper and lower leg members.

10. A bicycle fork travel limiter mounted to a bicycle frame, said frame including a front wheel fork having first and second legs extending around opposite sides of a front wheel, each of said legs having an upper leg member moveably connected to a corresponding lower leg member, and each of said lower leg members being movable relative to its corresponding upper leg member in a compression direction and an opposite, rebound direction through an original fork stroke, the travel limiter comprising:
(a) a travel limiter frame;
(b) a first connector drivingly linking the travel limiter frame to at least one of the upper leg members;
(c) a lock mounted on the travel limiter frame for rigidly locking the lock to the travel limiter frame upon actuation; and
(d) a second connector drivingly linking the lock to at least one of the lower leg members.

11. The bicycle fork travel limiter in accordance with claim 10, further comprising a bias mounted between the lock and the travel limiter frame for biasing the travel limiter frame in a predetermined direction.

12. The bicycle fork travel limiter in accordance with claim 10, wherein at least one of said connectors is a cable.

13. A bicycle fork travel limiter mounted to a bicycle frame, said frame including a front wheel fork having first and second legs extending around opposite sides of a front wheel, each of said legs having an upper leg member moveably connected to a corresponding lower leg member, and each of said lower leg members being movable relative to its corresponding upper leg member in a compression direction and an opposite, rebound direction through an original fork stroke, the travel limiter comprising:
(a) an elongated ratchet bar rigidly connected to at least one of the upper leg members of the fork, said ratchet bar having a longitudinal slot formed therein and a plurality of ratchet teeth formed on the outer surface of the ratchet bar;
(b) a shuttle slidably mounted in the longitudinal slot of the ratchet bar, said shuttle including a pawl with a teeth-engaging tip positioned near the ratchet teeth of the ratchet bar;
(c) an actuator switch for applying a force to the pawl tending to move the pawl relative to the ratchet bar for engaging the pawl with the ratchet teeth;
(d) a cable mounted to the shuttle and extending to rigid connection to at least one of the lower leg members; and
(e) a bias mounted between the shuttle and the ratchet bar for biasing the shuttle in a predetermined direction.

* * * * *